Feb. 3, 1970

M. MENDELSON 3,493,495

APPARATUS AND PROCESS FOR THE OSMOTIC SEPARATION OF
WATER FROM A SALINE SOLUTION

Filed Jan. 17, 1968

INVENTOR

MORRIS MENDELSON

BY Hauke, Kraus, Gifford, & Patalidi

ATTORNEYS

United States Patent Office 3,493,495
Patented Feb. 3, 1970

3,493,495
APPARATUS AND PROCESS FOR THE OSMOTIC SEPARATION OF WATER FROM A SALINE SOLUTION
Morris Mendelson, 16156 Oxley, Southfield, Mich. 48075
Filed Jan. 17, 1968, Ser. No. 698,667
Int. Cl. B01d 13/00
U.S. Cl. 210—23           10 Claims

ABSTRACT OF THE DISCLOSURE

A system for recovering fresh water by introducing two streams of sea water into a permeability cell. The first stream is delivered by a high pressure feed circuit to a semi-permeable membrane in the cell which passes fresh water and leaves more concentrated brine on its surface. The second stream is accumulated under low pressure in a secondary circuit which is normally fluidly isolated from the cell. Periodically the secondary circuit is connected with the high pressure crcuit to deliver a second stream of sea water into the cell to dilute the concentrated brine from the membrane surface. It is then again isolated from the high pressure circuit to allow for ejection of treated solution at low pressure and injection of a new charge of untreated solution at the same time.

BACKGROUND OF THE INVENTION

Field of the invention

This invention relates to the de-salting of sea and brackish water by the method of reverse-osmosis and more particularly to such an apparatus having means for removing the salts and other minerals that are collected on the surface of a semi-permeable membrane employed in a permeability cell for separating fresh water from sea water.

Description of the prior art

Reverse-osmosis is a process receiving considerable attention as a low cost means for separating fresh water from salt water. Essentially the proces consists of employing a membrane which is selective in that certain components of a saline solution can pass through the membrane while other components cannot do so. Such a membrane is referred to as a semi-permeable membrane because of its selectivity characteristics.

When a semi-permeable membrane is employed to separate fresh water and a saline solution, there is a tendency for the two liquids to equalize in concentration which tends to produce a flow of water from the fresh water side of the membrane to the saline side. This flow of water is commonly termed osmosis. If pressure is exerted on the saline solution the rate of flow toward the saline side decreases. As the pressure is increased, a point is reached where flow is brought to a complete stop, the tendency to flow being in equilibrium with the opposing pressure. This equilibrium pressure is called the osmotic pressure and is a property of the solution. A further pressure increase on the saline solution causes a reversal of the osmotic flow so that water begins to separate from the solution and flow through the membrane into the fresh water side. This phenomenon is the basis of the reverse-osmosis method of desalination.

In order to produce a reasonable fresh water output rate, conventional reverse-osmosis systems require a high-pressure, high-volume feed pump. The pump must raise the pressure of the saline solution considerably above its osmotic pressure. In addition the pump must deliver a large volume of water into the system to make up the fresh water that is separated by the membrane and to carry away the salts and minerals that precipitate on the surface of the membrane. If these salts are not removed, the capacity of the membrane is reduced and the osmotic pressure of the brine increases with the increasing salt concentration. Feed pumps that are rated to meet the pressure and volume requirements of conventional systems are costly to purchase and to operate.

The broad purpose of the present invention is to reduce the operating and equipment costs or reverse-osmosis desalination systems by providing a feed water system permitting the use of low cost pump means.

SUMMARY

The preferred embodiment of the present invention constitutes a system having a primary feed water circuit with high pressure, low volume pump and a secondary feed water circuit with a low pressure, high volume pump. The high pressure pump delivers a stream of feed water from a source of sea water into a permeability cell under a pressure of 1500 p.s.i. Fresh water permeates through a semi-permeable membrane in the cell leaving a residue of salts and minerals in the form of a highly concentrated brine solution.

The secondary feed water circuit includes a fluid storage means consisting of a chamber divided by a flexible diaphragm into first and second subchambers. Normally the secondary feed water circuit is fluidly separated from the primary circuit by valve means with the low pressure pump delivering feed water at 50 p.s.i. into the first subchamber. As the first subchamber is filled, the diaphragm is flexed into the second subchamber.

Periodically the valve means separating the two circuits are opened so that the pressure in the secondary circuit is raised to that of the primary circuit. The accumulated feed water in the filled first subchamber of the storage means is then delivered by the low pressure pump in the form of a second stream into the cell where it mixes with the concentrated brine. The brine and salts in the cell are washed from the membrane and delivered to the second subchamber of the storage means. The valve means are then closed and the cycle repeated with the low pressure pump filling the first subchamber so that the flexing diaphragm discharges the brine from the second subchamber to a brine collection means.

Thus the preferred system replaces the high pressure, high-volume pump of conventional systems with two pumps having lesser power consumption and a lesser total cost but a similar total capacity.

Other objects and advantages of the present invention will readily occur to one skilled in the art to which the invention pertains upon reference to the following detailed description.

DESCRIPTION OF THE DRAWINGS

The description refers to the accompanying drawing in which.

DESCRIPTION OF THE PREFERRED EMBODIMENT

Figure 1:
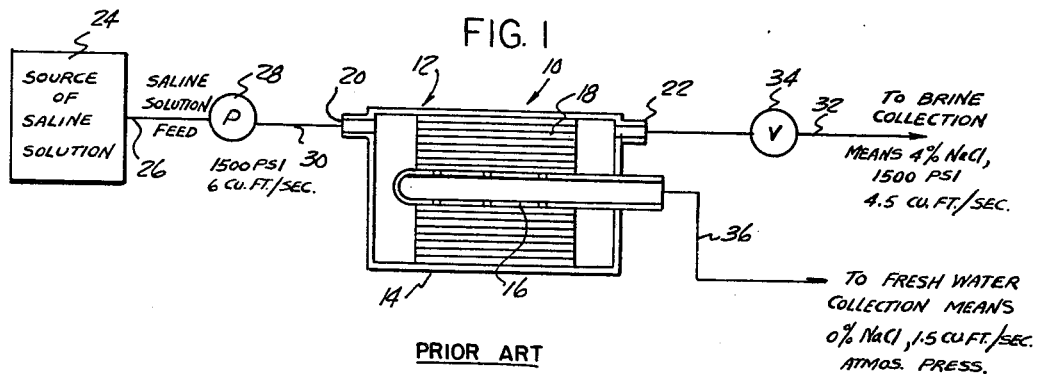
FIGURE 1 is a schematic view of a reverse-osmosis desalination system illustrating the prior art.

Referring to FIGURE 1 for a description of the prior art for purposes of a comparison with a preferred embodiment of the present invention, a conventional system 10 is illustrated as including a permeability cell 12 comprising of a tubular housing 14. A perforated fresh water collection pipe 16 is axially supported in the housing 14 and extends through one end of the housing.

A semi-permeable membrane 18 is disposed in the housing and wrapped around the collection pipe 16. The housing 14 has an inlet 20 at one end for receiving saline solution and an outlet 22 at its opposite end for the discharge of brine. The feed water input to the permeability cell 12 comes from a source 24 of saline solution such as sea water which is drawn through feed conduit 26 by a high pressure pump 28. The pump 28 takes the solution at atmospheric pressure, increases its pressure to 1500 p.s.i. and transfers it at the rate of six cubic feet per second through a conduit 30 to the inlet 20 of the permeability cell.

The feed water is delivered axially through the membrane 18 which permeates fresh water and a concentrated brine solution. The brine discharges through the outlet 22 and a conduit 32 to a suitable brine collection means. Valve means 34 in the conduit 32 provide means for controlling the brine flow rate. Normally the brine output of the cell has a substantial portion of its high input pressure energy. The fresh water is collected by the collection pipe 16 and discharges through a conduit 36 to a suitable fresh water collection means at atmospheric pressure.

For purposes of illustration, the input solution has a 3% concentration of salt which increases to a 4% concentration of salt in the brine discharge. The fresh water has a 0% concentration of salt. The 6 cubic feet per second input is divided into a 4.5 cubic feet per second brine discharge and 1.5 cubic feet per second fresh water discharge.

Thus, it can be seen that the single feed pump 28 has to fulfill two requirements. It must raise the pressure of the incoming, untreated solution to a pressure considerably in excess of the osmotic pressure of the solution. Secondly, the nature of the process is such that only a fraction of the water in the system is recovered from the solution if the salt concentration of the brine is kept at an acceptable level so that the pump 28 must produce a continuous and high flow rate of solution in order to recover an appreciable quantity of fresh water.

Figure 2:
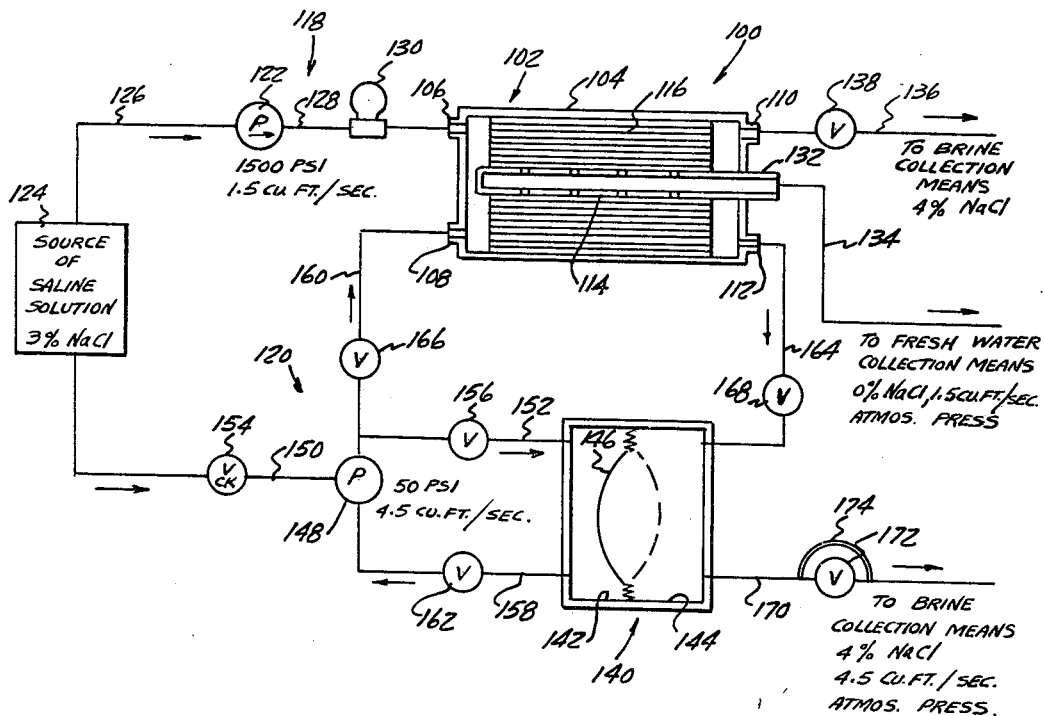
FIGURE 2 is a schematic illustration showing a reverse-osmosis desalination system illustrating the preferred embodiment of the present invention.

Now referring to FIGURE 2 for a description of the preferred embodiment, a desalination system 100 is illustrated as comprising a permeability cell 102 which is similar to the cell 12 of FIGURE 1 and comprises a tubular housing 104 having a pair of saline solution inlets 106 and 108 at one end and a pair of brine discharge outlets 110 and 112 at its opposite end. A perforated tubular fresh water collection pipe 114 extends substantially the full length of the interior of the housing 104 with its inner end closed and its outer end extending through the end of the housing.

A semi-permeable membrane 116 is mounted in the housing between the inlets 106 and 108, and the outlets 110 and 112 so that a saline solution introduced through the inlets passes axially through the housing for treatment by the membrane to produce fresh water and a concentrated brine.

The liquid flow through the cell 100 is governed by a high pressure, primary circuit generally indicated at 118 and a low pressure, secondary circuit generally indicated at 120. The high pressure circuit 118 comprises a high pressure, low volume continuously operating pump 122 which draws untreated saline solution from a source 124 through a feed conduit 126. The untreated solution is pressurized at 1500 p.s.i. which is considerably in excess of its osmotic pressure and delivered through a conduit 128 and a flow accumulator 130 to the inlet 106 of the cell 100. The pump 122 delivers about 1.5 cubic feet per second of untreated solution to the cell where it moves axially through the membrane 116. The membrane 116 permeates fresh water from the solution to a fresh water collection pipe 132 for discharge through a conduit 134 to a fresh water collection means. As the fresh water is removed from the saline solution, the remaining liquid represents a more concentrated brine some of which is discharged through the outlet 110 and a conduit 136 to a brine collection means. A valve 138 in the conduit 136 provides means for regulating the brine output from the cell 100.

The secondary circuit 120 includes a temporary storage means 140 having a fluid chamber divided into a pair of subchambers 142 and 144 by a flexible diaphragm 146. A low pressure, high volume, continuously operating pump 148 periodically draws untreated solution from the source 124 through a feed conduit 150, raises the pressure of the untreated solution to about 50 p.s.i. and delivers it at a rate of 4.5 cubic feet per second through a conduit 152 to the subchamber 142. A check valve 154 in the feed conduit 150 prevents reverse flow through the conduit toward the source 124. A valve 156 in the conduit 152 is normally open when the chamber 142 is being filled and closed when the solution is being drawn from the subchamber 142.

The pump 148 is adapted to draw solution from the subchamber 142 through a conduit 158 and discharge the solution through a conduit 160 to the inlet 108 of the permeability cell 100. A valve 162 in the conduit 158 is normally closed when solution is being introduced by the pump into the subchamber 142 and open when the pump 148 is drawing water from the subchamber 142. A conduit 164 is adapted to provide a fluid connection between the outlet 112 of the permeability cell 100 and the subchamber 144 of the storage means. A valve 166 in the conduit 160 and a valve 168 in the conduit 164 are normally closed to fluidly isolate the secondary circuit 120 from the primary circuit 118. When the valves 166 and 168 are closed, the entire primary circuit is under the pressure produced by the pump 122 and the pressure in the secondary circuit is influenced by the low pressure pump 148, however, when the valves 166 and 168 are open, the pressure in the secondary circuit 120 increases to the pressure level in the primary circuit 118.

A discharge conduit 170 provides an outlet from the subchamber 144 to the brine collection means. A check valve 172 having a bleeder means 174 is disposed in the discharge conduit 170 and adapted to automatically close when the secondary circuit is connected with the primary circuit 118 so that the pressures in the two circuits are both high at which time the flow through the conduit 170 is governed by the bleeder means 174. When the secondary circuit is fluidly isolated from the primary circuit, the valve 172 opens to provide fluid communication between the subchamber 144 and the brine collection means.

The operaing cycle of the preferred system may be considered as consisting of two phases; a first phase when the valves 166 and 168 are closed to fluidly separate the primary and secondary circuits, and a second phase when the valves 166 and 168 are opened to fluidly connect the two circuits. Considering the first phase, with the valves 166 and 168 closed, the high pressure pump 122 introduces untreated solution from the source 124 into the permeability cell where the membrane 116 permeates fresh water leaving a residue of salts and a concentrated brine. In the secondary circuit 120, the valve 162 is closed and the valve 156 is open so that the pump 148 pumps solution at a relatively low pressure of 50 p.s.i. into the subchamber 142. As the subchamber 142 is filled, the diaphragm 146 flexes toward the right to the position indicated in phantom. As the diaphragm 146 flexes into the subchamber 144, it removes brine in the chamber 144 through the conduit 170 to the brine collection means.

The second phase of the operating cycle is initiated by the opening of valves 166 and 168. Since the secondary circuit 120 is completely full of water, it immediately responds with a pressure increase that approaches the high pressure of the primary circuit 118. The check valves 154 and 172 automatically close so that the pressure in the secondary circuit 120 is not lost. Assuming the pressure in the secondary circuit has been equalized with the pressure and the valve 162 is opened so that the pump 148 commences to draw solution from the chamber 142 through the conduit 158 and to discharge this solution through the conduit 160 into the inlet 108 of the permeability cell. The pump 148, in addition to transferring the water from the subchamber 142 to the permeability cell, adds sufficient pressure to form a second stream of feed solution which enters the cell 100 and mixes with the stream of solution introduced through the inlet 106. The mixed streams wash the salts and minerals that have accumulated in the solution of the membrane 116 and then pass through the outlet 112 into the subchamber 144. Thus, as the pump 148 empties the subchamber 142 so that the diaphragm 146 tends to flex toward the subchamber 142, the subchamber 144 is filled with brine.

This second phase is continued until the subchamber 142 is substantially empty of untreated solution and the subchamber 144 is substantially full with brine. The valves 166 and 168 are then closed to isolate the secondary circuit 120 from the primary circuit 118 and the valve 138 is opened. The primary system continues to operate at its normal high pressure while the pressure in the secondary system is reduced by the bleeder means 174 until the valve 172 automatically opens to the atmosphere to permit the brine in the chamber 144 to discharge through the conduit 170.

The flow accumulator 130 insures that the flow rate through the membrane remains at a substantially constant level when the secondary circuit 120 is fluidly connected with the primary circuit 118 as well as when the two circuits are separated so that the fresh water output is uninterrupted. For purposes of description, the solution from the source 124 has a 3% concentration of salt, the brine has a concentration of 4% of salt and the fresh water has a salt concentration of 0%.

Comparing the prior art system illustrated in FIGURE 1 to the system made in accordance with the present invention and shown in FIGURE 2, it can be seen that the single high pressure, high volume pump of the prior art has been replaced by two pumps, a high pressure, low volume pump and a low pressure, high volume pump. The two pumps of the preferred system are commercially less costly than the single high pressure and high capacity pump for a system having comparable input and output levels, and require a great deal less power to operate.

It is to be understood that the particular structure of the permeability cell 102 is not essential to the invention and that other types of semi-permeable membranes may be employed for separating the fresh water from the saline solution.

Having described my invention, I claim:

1. Apparatus for separating relatively pure water from an untreated aqueous solution, comprising:
    a housing;
    a semi-permeable membrane positioned in said housing, said membrane having first and second sides and being adapted to permeate water through to said second side leaving a treated aqueous solution on said first side when untreated aqueous solution under a pressure in excess of the osmotic pressure of said untreated aqueous solution is introduced to said first side;
    a source of untreated solution;
    a primary feed circuit for delivering a first stream of untreated solution from said source into said housing under an operating pressure in excess of the osmotic pressure of said solution for treatment by said membrane;
    means for storing a supply of solution and means for periodically directing a second stream of solution from said storing means into said housing under a pressure greater than the operating pressure of said first stream so that said second stream removes the treated solution in said housing from the first side of said membrane; and
    said last mentioned means including a treated solution storing means connected with the outlet side of said membrane and means expelling treated solution from said last mentioned storing means upon filling of said first mentioned storing means with solution.

2. A process for separating relatively pure water from an untreated aqueous solution, comprising the steps of:
    pressurizing an untreated aqueous solution to an operating pressure greater than the osmotic pressure of said untreated solution;
    delivering the pressurized untreated solution in a first stream to a semi-permeable membrane separation means so that water is separated from said untreated solution leaving a treated solution on one side of said membrane separation means;
    delivering solution to a storage means;
    periodically introducing a second stream of solution into said membrane separation means from said storage means at a pressure greater than the operating pressure of said first stream so that the second stream removes the treated solution from said one side of said membrane separation means; and
    utilizing the pressure produced upon delivery of the solution to the storage means to carry off treated solution from said membrane.

3. A process for separating relatively pure water from an untreated aqueous solution, comprising the steps of:
    pressurizing an untreated aqeuous solution to an operating pressure greater than the osmotic pressure of said untreated solution;
    delivering the pressurized untreated solution in a first stream to a semi-permeable membrane separation means so that water is separated from said untreated solution leaving a treated solution on one side of said membrane separation means;
    storing a quantity of untreated solution on one side of the diaphragm in a chamber having a flexible diaphragm;
    periodically introducing a second stream of untreated solution into said membrane separation means from said chamber at a pressure greater than the operating pressure of said first stream so that the second stream removes the treated solution from said one side of said membrane separation means;
    delivering treated solution from said membrane separation means into said chamber on the side of said flexible diaphragm opposite said untreated solution as said second stream is introduced into said membrane separation means; and
    discharging the treated solution from said chamber to a brine collection means by the introduction of said untreated solution into said chamber and consequent flexing of said diaphragm.

4. A process for separating relatively pure water from an untreated aqueous solution, comprising the steps of:
    pressurizing an untreated aqueous solution to an operating pressure greater than the osmotic pressure of said untreated solution;
    delivering the pressurized untreated solution in a first stream to a semi-permeable membrane separation means so that water is separated from said untreated solution leaving a treated solution on one side of said membrane separation means;
    accumulating untreated solution in a storage chamber;
    opening a fluid connection between said storage chamber and said membrane separation means so that the pressure of the untreated solution in said storage chamber approaches the operating pressure of said first stream;
    delivering the untreated solution from said storage chamber to said membrane separation means in a second stream by a pump operative to raise the pressure of said second stream to a pressure greater than said operating pressure so that the second stream removes the treated solution from said one side of said membrane separation means.

5. Apparatus for separating relatively pure water from an untreated aqueous solution comprising:

a housing and a semi-permeable membrane positioned in said housing, said membrane having first and second sides being adapted to permeate water through to said second side leaving a treated aqueous solution on said first side when untreated aqueous solution under a pressure in excess of the osmotic pressure of said untreated aqueous solution is introduced to said first side;

a source of untreated solution and a primary feed circuit delivering a first stream of untreated solution from said source into said housing under an operating pressure in excess of the osmotic pressure of said solution for treatment by said membrane;

means for periodically introducing a second stream of untreated solution into said housing under a pressure greater than the operating pressure of said first stream so that said second stream removes the treated solution in said housing from the first side of said membrane;

said last mentioned means includes a secondary feed circuit comprising, a fluid storage chamber, first conduit means connecting said storage chamber to said source of untreated solution;

means for delivering untreated solution from said source to said storage chamber at a pressure less than the operating pressure of said first stream of solution, a second conduit means connecting said storage chamber to said housing, valve means in said second conduit means having a closed condition for fluidly isolating said housing and said storage chamber when untreated solution is being delivered into said storage chamber and an open condition for opening communication between said housing and said storage chamber and means for transferring untreated solution from said chamber through said second conduit means to produce said second stream of untreated solution when the valve means in said second conduit means are open.

6. The apparatus as defined in claim 5, wherein said secondary feed circuit has a pump operative to deliver untreated solution from said source to said chamber when the valve means in said second conduit means are closed, and to transfer untreated solution from said chamber through said second conduit when the valve means in said second conduit means are open.

7. The apparatus as defined in claim 6, wherein said pump is operative to raise the pressure of untreated solution transferred from said chamber to said housing to a pressure greater than the operating pressure of said first stream of untreated solution.

8. The apparatus as defined in claim 5, including a flexible diaphragm dividing said chamber into a pair of subchambers including a first subchamber connected by said first conduit means to said source of untreated solution and by said second conduit means to said housing; third conduit means connecting said housing and said second subchamber for the transfer of treated solution from said housing; and valve means in said third conduit means having a closed condition for fluidly isolating said housing and said second subchamber and an open condition for opening communication between said housing and said second subchamber.

9. The apparatus as defined in claim 8, including fourth conduit means connecting said second subchamber to a brine collection means so that when the pump in said secondary circuit introduces untreated solution into said first subchamber, said diaphragm flexes into said second subchamber to remove treated solution from said second subchamber through said fourth conduit means to said brine collection means.

10. The apparatus as defined in claim 9, including first check valve means in said first conduit means and second check valve means in said fourth conduit means, both of said check valve means being operative to assume a closed condition when said first and second subchambers are fluidly connected with said housing so that the pressure of the untreated solution in said secondary circuit approaches the operating pressure of the first stream of said untreated solution, and to assume an open condition when said first and second subchambers are fluidly isolated from said housing.

References Cited

UNITED STATES PATENTS

| 2,889,048 | 6/1959 | Nordin | 210—409 |
| 3,355,382 | 11/1967 | Huntington | 210—22 |

REUBEN FRIEDMAN, Primary Examiner

F. A. SPEAR, Jr., Assistant Examiner

U.S. Cl. X.R.

210—136, 321, 409